United States Patent [19]
David

[11] Patent Number: 5,842,687
[45] Date of Patent: Dec. 1, 1998

[54] SELF-ALIGNING VIBRATION MOUNT WITH COMPOUND-ANGLED FLEXING ELEMENTS

[75] Inventor: Thomas A. David, Erie, Pa.

[73] Assignee: Lord Corporation, Cary, N.C.

[21] Appl. No.: 845,294

[22] Filed: Apr. 25, 1997

[51] Int. Cl.$^6$ .................................................. F16M 1/00
[52] U.S. Cl. .................................. 251/140.5; 267/141.3; 267/153
[58] Field of Search .................................. 267/276, 281, 267/140.5, 140.2, 141, 141.2, 141.3, 141.7, 152, 153; 248/636, 562

[56] References Cited

U.S. PATENT DOCUMENTS

| | | | |
|---|---|---|---|
| 2,812,175 | 11/1957 | Hirst | 267/63 |
| 2,893,570 | 7/1959 | Mulcahy | 213/44 |
| 3,047,163 | 7/1962 | Johnson et al. | 213/40 |
| 3,244,386 | 4/1966 | Bourgeois | 267/141.3 |
| 3,684,271 | 8/1972 | Arthur | 267/152 |
| 4,023,438 | 5/1977 | Birkle et al. | 74/574 |
| 4,589,347 | 5/1986 | Colford et al. | 105/224 |
| 4,747,587 | 5/1988 | Ferrel | 267/220 |
| 4,768,611 | 9/1988 | Schmitt | 180/300 |
| 4,859,148 | 8/1989 | Hibyan | 416/134 |
| 4,872,651 | 10/1989 | Thorn | 267/140 |
| 4,930,758 | 6/1990 | Poirier | 269/292 |
| 5,033,722 | 7/1991 | Lammers | 267/153 |
| 5,080,335 | 1/1992 | Solleder et al. | 267/153 X |
| 5,102,107 | 4/1992 | Simon et al. | 267/152 |
| 5,174,540 | 12/1992 | Gilliam | 267/141.3 |
| 5,242,146 | 9/1993 | Tecco et al. | 248/638 |
| 5,280,885 | 1/1994 | Noguchi | 267/140.12 |
| 5,286,011 | 2/1994 | Strand | 267/140.12 |
| 5,531,426 | 7/1996 | Bruhl | 267/140.5 X |
| 5,579,860 | 12/1996 | Halverson et al. | 180/89.14 |

FOREIGN PATENT DOCUMENTS

| 537731 | 6/1959 | Belgium | 267/153 |
|---|---|---|---|

OTHER PUBLICATIONS

A. B. Davey, A. R. Payne, "Rubber in Engineering Practice", 1964, pp. 378–379.

*Primary Examiner*—Lee W. Young
*Attorney, Agent, or Firm*—Randall S. Wayland; Richard K. Thomson

[57] ABSTRACT

A bushing style mount with low stiffness in two directions oriented with one of the low stiffness directions vertically to provide better isolation. Two elastomeric layers are bonded to two non-parallel surfaces of an inner member, on the one hand, and to a pair of plates on the other. Each of the plates has a contoured, non-planar configuration which increases the axial stiffness of the mount so that the truck cab's lateral motion is minimized. The inner member's non-parallel surfaces are also non-planar, preferably matching the non-planar configuration of the plates, such that the bonded elastomer is deflected into a vee configuration, for example. The inner member with the two elastomeric layers bonded thereto with the two plates bonded, in turn, to the outer faces of the elastomer, form a subassembly that is installed into a generally cylindrical housing. The housing and the outside faces of the plates have a mating contour which provides an alignment feature. For example, the housing may have a pair of inward protrusions which may take the form of darts formed in the tubular housing that engage in notches on the back sides of the two plates. The inner dimension of the housing is less than the maximum outer dimension of the subassembly such that the plates are deflected inward by the inner diameter of the housing compressing the elastomeric layers, while the darts engage in the locator notches. The inward deflection of the plates preloads the elastomeric members in both shear and compression. While this pre-compression may lie in the range of between 5% and 20% of the elastomeric member's pre-installed thickness, it is more preferably in the 10% to 15% range. The preload enhances durability and the notches perform a locator function as the mount functions during the cab tilt process.

20 Claims, 3 Drawing Sheets

5,842,687

SELF-ALIGNING VIBRATION MOUNT WITH COMPOUND-ANGLED FLEXING ELEMENTS

BACKGROUND AND SUMMARY OF THE INVENTION

The present invention is directed to an elastomeric mount for use in supporting truck cabs, and the like. More particularly, the present invention is directed to a contoured mount that can be housed in a manner similar to a cylindrical bushing. Further, the contour on the mount of the present invention provides a self-alignment feature such that when the tilted cab is restored to its latched position, the elements of the mount will naturally be realigned.

At the time of this invention, the practice in the industry is to use a center bonded or unbonded bushing-type mount to provide the front support for the truck cab of a cab-over-engine (C-O-E) rig. A pair of such bushing-type mounts are positioned on opposite sides of the cab with their axes extending laterally of the chassis and form the pivot for the tiltable truck cab. These mounts are softest in the axial direction, resisting motion lateral to the cab only in shear. Clearances are tight so it is important that motion, even in the mount's softest direction, be minimized. In addition, cab tilt mechanisms apply high loads (typically about 10 times the static cab weight load) to the mount. Hence, in order to accommodate tilt loads and ensure that the cab will not be banging into frame-mounted components, a very stiff bushing-type mount is used, resulting in an unusually rough ride. Hence, one reason C-O-E trucks are disfavored in the industry is their stiff ride.

The present invention produces the desired improved ride by providing a bushing style mount with low stiffness in two directions and orienting one of the low stiffness directions vertically to provide better isolation. Two elastomeric layers are bonded to two non-parallel surfaces of an inner member, on the one hand, and to a pair of plates on the other. Each of the plates has a contoured, non-planar configuration which increases the axial stiffness of the mount so that the truck cab's lateral motion is minimized without the need to stiffen the elastomer (or the ride). The inner member's non-parallel surfaces are also non-planar, preferably matching the non-planar configuration of the plates, such that the bonded elastomer is deflected into a vee configuration, for example. The inner member with the two elastomeric layers bonded thereto with the two plates bonded, in turn, to the outer faces of the elastomer, form a subassembly that is installed into a generally cylindrical housing.

The housing and the outside faces of the plates have a mating contour which provides an alignment feature. For example the housing may have a pair of inward protrusions which may take the form of darts formed in the tubular housing that engage in notches on the back sides of the two plates. The inner dimension of the housing is less than the maximum outer dimension of the subassembly such that the plates are deflected inward by the inner diameter of the housing compressing the elastomeric layers, while the darts engage in the locator notches. The inward deflection of the plates preloads the elastomeric members in both shear and compression. While this precompression may lie in the range of between 5% and 20% of the elastomeric member's pre-installed thickness, it is more preferably in the 10% to 15% range. The preload enhances durability and the notches perform a locator function as the mount functions during the cab tilt process.

To tilt the cab for engine service, etc., a hydraulic cylinder typically applies a high load in the forward direction to a short lever arm. The rear of the cab pivots upward while the front mount simultaneously acts as a hinge point, carries the cab weight and reacts the cylinder force. The hydraulic cylinder force moves the inner member radially with respect to the housing, and is high enough to cause the plate in the relieved direction to lift away from the housing. When the cab is set back down in place, the locator notches on the plate engage the darts on the housing inner diameter, ensuring that the plate and housing are aligned. The inner member, which contains a low-friction bearing surface on its inner diameter, can freely pivot about its mounting bolt assembly so as to act as a hinge point during cab tilt.

While this invention has been described as being useful in mounting C-O-E truck cabs, it could obviously be used in other applications where a repeatable alignment function is needed, such as when high radial loading may cause one of the plates to be displaced from contact with the housing. The dart/notch interface will enable the mount to be properly reseated within the housing when the high radial loading is removed.

Various other features, advantages and characteristics of the present invention will become apparent after a reading of the following specification.

BRIEF DESCRIPTION OF THE DRAWINGS

The present invention is described in terms of the preferred embodiments as shown in the Figures, in which

FIG. 2b is a cross sectional top view of the first embodiment as seen along line 2b—2b in FIG. 2a;

DETAILED DESCRIPTION OF THE PREFERRED EMBODIMENTS

Figure 2A:
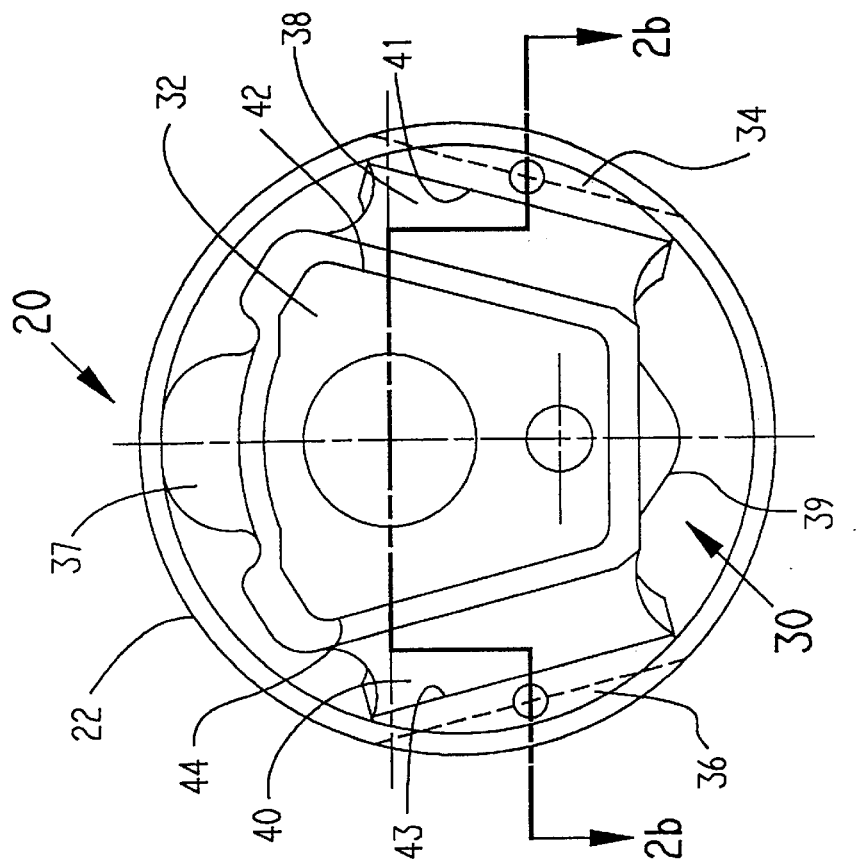
FIG. 2a is an end view of the mount of the first embodiment.
Figure 1:
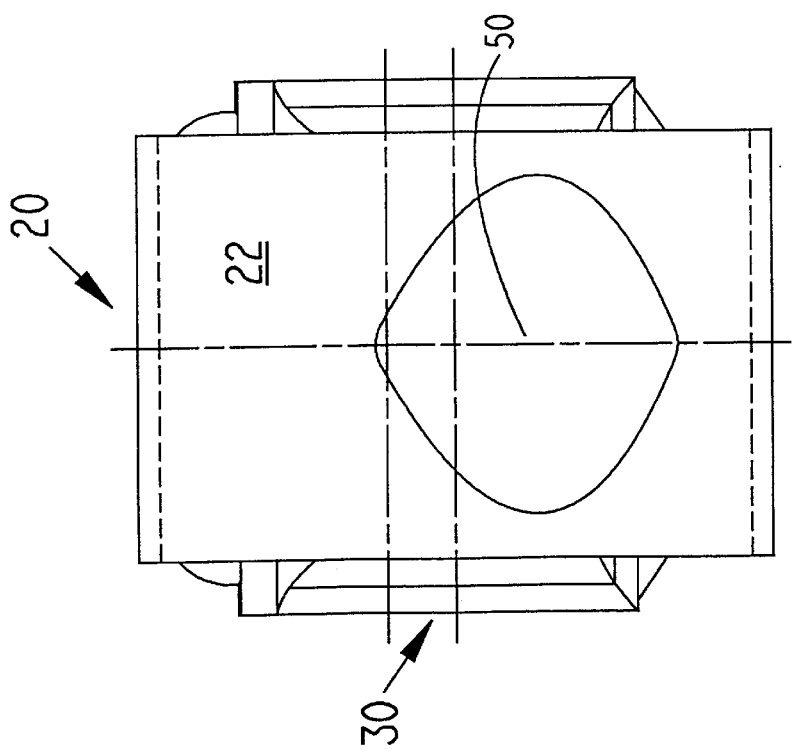
FIG. 1 is side view of a first embodiment of the mount of the present invention.
Figure 2B:
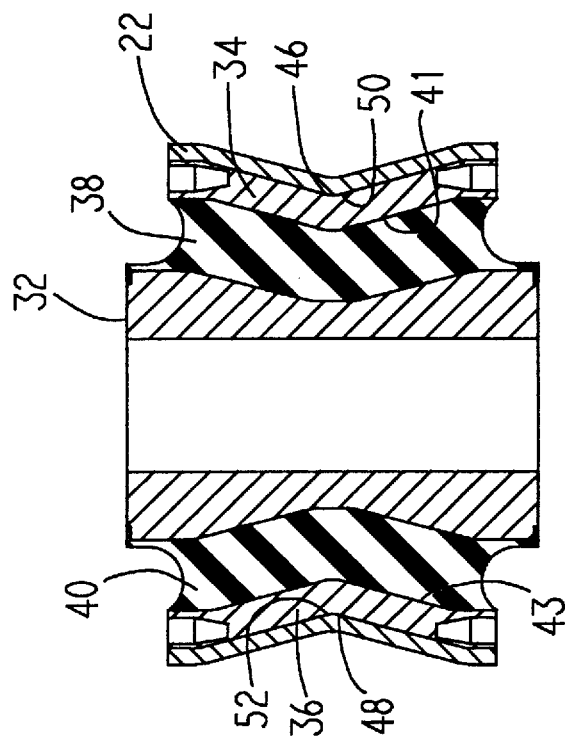

A first embodiment of the mount of the present invention is shown in FIGS. 1, 2a, 2b generally at 20. A generally cylindrical housing 22 receives a sub-assembly 30 which includes inner member 32, a pair of plates 34 and 36 and two elastomeric members 38 and 40. Inner member 32 has at least two non-planar, non-parallel surfaces 42 and 44 to which elastomeric members 38 and 40 are bonded. The opposing faces of elastomeric members 38 and 40 are bonded to faces 41 and 43 of plates 34 and 36, respectively. Faces 41 and 43 are preferably complementary to non-planar faces 42 and 44 such that elastomeric members 38 and 40 will be deformed into the shape defined by these opposing surfaces. The apertures in the edges of plates 34 and 36 are utilized to hold them upright in the molds during bonding of elastomeric members 38 and 40 and form no part of the present invention.

Inner member 32 and plates 34 and 36 are preferably made of a plastic material to make them easy to form and assemble, to reduce weight, and to make sub-assembly 30 somewhat flexible. In addition, plastic inner member 32 will turn freely on its mounting bolt assembly, which may include a bolt and a metal sleeve surrounding it. Alternatively, inner member may advantageously be made of aluminum with a plastic sleeve bearing, for some applications. Inner member 32 is provided with a layer of elastomer that includes upper (37) and lower (39) snubbers for cushioning movement of sub-assembly 30 relative to housing 22. FIG. 2a shows the position of sub-assembly 30 in housing 22 prior to installation of the mount. When mount 20 is loaded (installed), snubbers 37 and 39 will provide appropriate travel clearances to housing 22.

Figure 4:
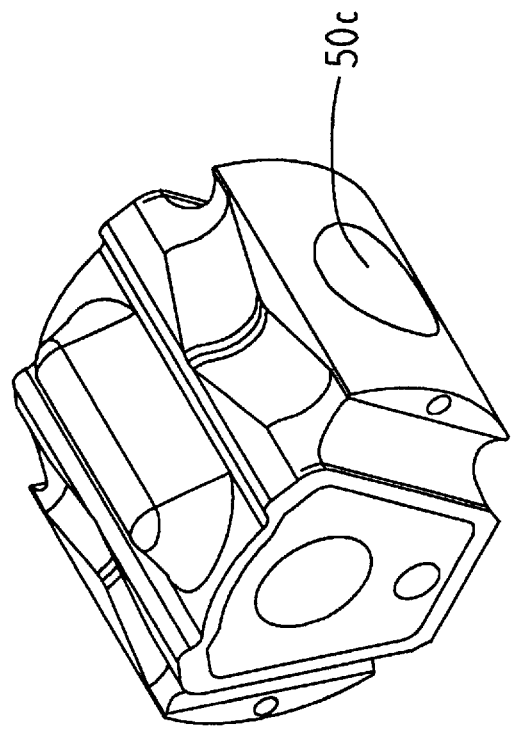
FIG. 4 is an enlarged perspective view of the inner subassembly of a third embodiment of the mount of the present invention.

The outer faces of plates 34 and 36 have locator notches 46 and 48 (FIG. 2b) formed therein. Protrusions 50 and 52 formed on housing 22 engage in notches 46 and 48 and provide a repeatable positioning function, that is, protrusions 50 and 52 will serve to properly align plates 32 and 34 in housing 22 on original installation and, further, should high radial forces, such as are caused by the tilting of an attached truck cab from over its engine for servicing of the engine, cause plate 32 or 34 to move radially inwardly away from the housing 22, when the radial forces abate, the protrusions 50 and 52 will reseat in notches 46 and 48 to properly realign the subassembly 30 in the housing 22. Protrusions 50 and 52 can be formed as darts (v-shaped indentations) in the tubular housing 22. Other shapes, such as spherical (as shown in FIG. 4 at 50c) are also possible, as well.

The sub-assembly 30 will have a slightly larger lateral extent prior to assembly than after the sub-assembly is inserted in housing 22. In this manner, elastomeric members 38 and 40 will be preloaded in both compression and shear. This enhances the locating function of the protrusion-notch interface as well as increases the wear life of the elastomer in the elastomeric members 38 and 40. Protrusions 50 and 52 in notches 46 and 48 provide both a circumferential and an axial locating function for the sub-assembly 30 within housing 22.

Figure 3A:
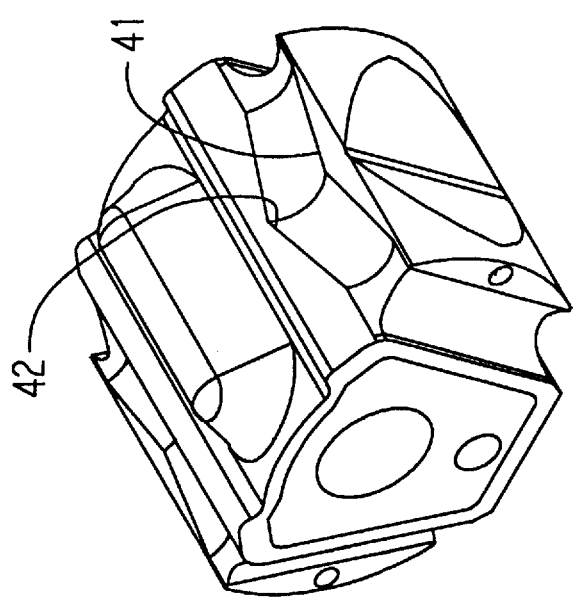
FIG. 3a is an enlarged perspective view of the inner subassembly of the mount of the first embodiment.
Figure 3B:
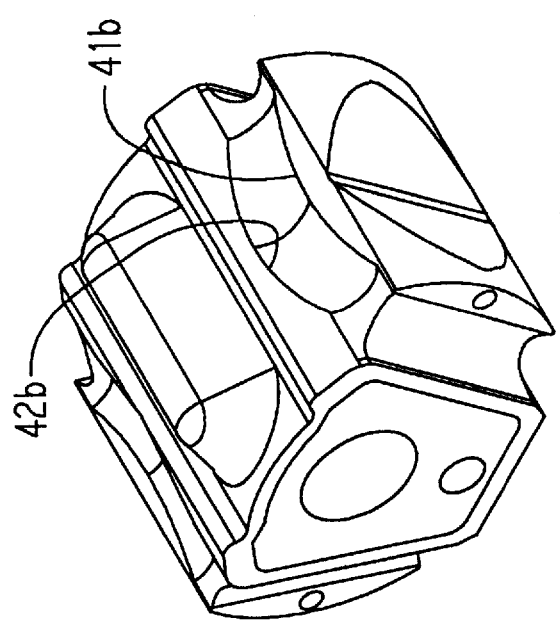
FIG. 3b is an enlarged perspective view of the inner subassembly of a second embodiment of the mount of the present invention.

As best seen in FIG. 3a, the preferred configuration of non-planar surfaces 42 and 44, as well as of complementary surfaces 41 and 43, is v-shaped. This configuration provides optimum preload of the elastomer as well as stiffening of the elastomer in the axial direction. Other configurations are also possible. As seen in FIG. 3b, surfaces 41b, 42b, and their counterparts on the opposite side can have a cylindrical contour. As an additional alternative, the contours can be bulges, rather than indentations.

With the features of the present invention, the mount 20 can be made much softer vertically than comparable cylindrical mounts. This will afford a softer ride for cab-over-engine truck applications, as well as for certain off-highway vehicles, as well. The axial stiffness of the mount can be made equal to or even greater than the vertical stiffness, rather than being one-half to one-tenth the vertical stiffness, as is typical for bushing mounts. Further, the mount of the present invention may find broader applications where ride is not an issue, but the application requires a repeatable positioning function where high radial loads cause displacement between unbonded parts, such as the plates 34 and 36 and housing 22.

Various changes, alternatives and modifications will become apparent to a person of ordinary skill in the art after a reading of the foregoing specification. It is intended that all such changes, alternatives and modifications as fall within the scope of the appended claims be considered part of the present invention.

What is claimed is:

1. A vibration isolation mount comprising
   a) an inner member having at least two non-planar non-parallel surfaces;
   b) first and second plates each having a non-planar face which extends generally parallel to one of said at least two non-parallel surfaces and a locator notch on an opposite side from said non-planar face;
   c) a pair of elastomeric members, one positioned between and bonded to each of a first of said at least two non-parallel surfaces and said non-planar face of said first plate and a second of said pair of elastomeric members positioned between and bonded to each of a second of said at least two non-parallel surfaces and said non-planar face of said second plate;
   d) a housing formed as a generally cylindrical member, said generally cylindrical member having a pair of opposed locator protrusions on its inner surface, said locator protrusions engaging said locator notches in said first and second plates to provide a repeatable positioning function.

2. The vibration isolation mount of claim 1 wherein said mount comprises a front mount of a cab-over-engine support system, said inner member receiving a mounting bolt assembly therethrough, said mounting bolt assembly providing a rotational pivot axis for tilting a passenger cab forward from over its engine to provide service access.

3. The vibration isolation mount of claim 2 wherein said mount comprises a first of two identical front mounts in said cab-over-engine support system.

4. The vibration isolation mount of claim 2 wherein said mounting bolt assembly includes a sleeve member that is received in an opening in said inner member and an attachment bolt which extends through said sleeve.

5. The vibration isolation mount of claim 2 wherein said inner member comprises a plastic element such that said mounting bolt assembly turns freely therein such that said pair of elastomeric members are not torsionally loaded as a result of tilting said passenger cab.

6. The vibration isolation mount of claim 5 wherein said first and second plates are made of a plastic material.

7. The vibration isolation mount of claim 6 wherein said housing has an inner diameter which is exceeded by a pre-installed dimension of a sub-assembly including said inner member with said pair of elastomeric members and said first and second plates bonded thereto, whereby installation of said sub-assembly causes said housing to compress said pair of elastomeric members, each of said non-planar faces of said first and second plates preloading its elastomeric member in shear and compression.

8. The vibration isolation mount of claim 7 wherein each of said elastomeric members is preloaded by an amount in the range of between 5% and 20% of its pre-installed thickness.

9. The vibration isolation mount of claim 8 wherein each of said elastomeric members is preloaded by an amount in the range of between 10% and 15% of its pre-installed thickness.

10. The vibration isolation mount of claim 7 wherein each of said non-parallel surfaces of said inner member has a non-planar configuration, each said non-planar configuration being generally parallel to one of said non-planar faces on said first and second plates.

11. The vibration isolation mount of claim 1 wherein said first and second plates are made of a plastic material.

12. The vibration isolation mount of claim 11 wherein said housing has an inner diameter which is exceeded by a pre-installed dimension of a sub-assembly including said inner member with said pair of elastomeric members and said first and second plates bonded thereto, whereby installation of said sub-assembly causes said housing to compress said pair of elastomeric members, each of said non-planar faces of said first and second plates preloading its elastomeric member in shear and compression.

13. The vibration isolation mount of claim 12 wherein each of said elastomeric members is preloaded by an amount in the range of between 5% and 20% of its pre-installed thickness.

14. The vibration isolation mount of claim 13 wherein each of said elastomeric members is preloaded by an amount in the range of between 10% and 15% of its pre-installed thickness.

15. The vibration isolation mount of claim 1 wherein each of said non-parallel surfaces of said inner member has a non-planar configuration, each said non-planar configuration being generally parallel to one of said non-planar faces on said first and second plates.

16. The vibration isolation mount of claim 1 wherein said housing is a metal tube and said locator protrusions are formed therein.

17. The vibration isolation mount of claim 16 wherein said locator protrusions comprise a pair of darts formed in said metal tube.

18. The vibration isolation mount of claim 1 wherein said locator notches provide both circumferential positioning and longitudinal positioning of said plates relative to said housing.

19. A mount subassembly, comprising:
   (a) first and second spaced apart plates each having an inwardly disposed non-planar face and an outwardly disposed surface, said inwardly disposed non-planar faces also being non-parallel to, and opposed to, each other,
   (b) an inner member having first and second outwardly disposed non-planar surfaces, said first and second outwardly disposed non-planar surfaces being non-parallel, and
   (c) a pair of elastomer members, a first one being bonded between said non-planar face of said first plate and said first non-planar surface of said inner member, a second one of said elastomer members being bonded between said non-planar face of said second plate and a second non-planar surface of said inner member, each of said elastomer members including a contour shape defined by respective opposed ones of said outwardly disposed non-planar surfaces and said inwardly disposed non-planar faces, said contour shape of each said elastomer member consisting of a single trough substantially centrally located along its axial width and which is also substantially vertically oriented.

20. An elastomer mounting, comprising:
   (a) a subassembly further comprising;
      (i) first and second spaced apart plates each having an inwardly disposed non-planar face and an outwardly disposed arcuate surface, said inwardly disposed non-planar faces also being non-parallel to, and opposed to, each other,
      (ii) an inner member having first and second outwardly disposed non-planar surfaces, said first and second outwardly disposed non-planar surfaces being non-parallel, and
      (iii) a pair of elastomer members, a first one being bonded between said non-planar face of said first plate and said first non-planar surface of said inner member, a second one of said elastomer members being bonded between said non-planar face of said second plate and a second non-planar surface of said inner member, each of said elastomer members including a contour shape defined by respective opposed ones of said outwardly disposed non-planar surfaces and said inwardly disposed non-planar faces, said contour shape of each said elastomer member including a trough substantially centrally located along its axial width and which is also substantially vertically oriented,
   (b) a housing including a cylindrical inner surface which receives said outwardly disposed arcuate surfaces of said plates, and
   (c) protrusions means for aligning said subassembly in said housing.

* * * * *